(12) United States Patent
Petrenko

(10) Patent No.: US 6,847,024 B2
(45) Date of Patent: Jan. 25, 2005

(54) PREVENTION OF ICE FORMATION BY APPLYING ELECTRIC POWER TO A LIQUID WATER LAYER

(75) Inventor: Victor F. Petrenko, Lebanon, NH (US)

(73) Assignee: Trustees of Dartmouth College, Hanover, NH (US)

(*) Notice: Subject to any disclaimer, the term of this patent is extended or adjusted under 35 U.S.C. 154(b) by 156 days.

(21) Appl. No.: 09/970,555

(22) Filed: Oct. 4, 2001

(65) Prior Publication Data

US 2002/0096515 A1 Jul. 25, 2002

Related U.S. Application Data

(60) Continuation-in-part of application No. PCT/US00/35529, filed on Dec. 28, 2000, and a continuation-in-part of application No. 09/426,685, filed on Oct. 25, 1999, which is a division of application No. 09/094,779, filed on Jun. 15, 1998, now Pat. No. 6,027,075.

(60) Provisional application No. 60/283,670, filed on Apr. 12, 2001, provisional application No. 60/262,775, filed on Jan. 19, 2001, and provisional application No. 60/173,920, filed on Dec. 30, 1999.

(51) Int. Cl.$^7$ ................................................ H05B 6/70
(52) U.S. Cl. .................................. 219/770; 244/134 R
(58) Field of Search ................................. 219/770, 497, 219/209, 772, 780; 244/134 R, 134 D, 134 F, 138 R; 174/110 R, 102 R, 115, 128.1; 206/317, 589; 307/147; 392/311, 312; 405/128.6; 166/245, 248; 588/253

(56) References Cited

U.S. PATENT DOCUMENTS

| | | | | |
|---|---|---|---|---|
| 4,376,598 A | * | 3/1983 | Brouns et al. | 588/253 |
| 4,651,825 A | * | 3/1987 | Wilson | 166/245 |
| 5,012,868 A | * | 5/1991 | Bridges | 166/248 |
| 5,330,291 A | * | 7/1994 | Heath et al. | 405/128.6 |
| 5,586,213 A | * | 12/1996 | Bridges et al. | 392/312 |

* cited by examiner

Primary Examiner—Quang T. Van
(74) Attorney, Agent, or Firm—Lathrop & Gage, LC

(57) ABSTRACT

A first electrode is separated from a second electrode by an interelectrode space. The interelectrode space does not exceed 3 mm, and preferably does not exceed 100 μm. Liquid water fills the interelectrode space, thereby electrically connecting the first electrode and the second electrode. A power supply, preferably low-frequency AC, is connected to the first and second electrodes, generating a current through the water in the interelectrode space. The applied electric power prevents freezing of a thin liquid water layer in the interelectrode space, thereby preventing ice formation.

11 Claims, 4 Drawing Sheets

PREVENTION OF ICE FORMATION BY APPLYING ELECTRIC POWER TO A LIQUID WATER LAYER

RELATED APPLICATIONS

This application claims the benefit of U.S. provisional applications Ser. No. 60/262,775, filed Jan. 19, 2001, and Ser. No. 60/283,670, filed Apr. 12, 2001. This application is also a continuation-in-part application of commonly-owned and co-pending U.S. patent application Ser. No. 09/426,685, filed Oct. 25, 1999, which is a divisional application of U.S. patent application Ser. No. 09/094,779, filed Jun. 15, 1998, issued as U.S. Pat. No. 6,027,075 on Feb. 22, 2000; and this application is also a continuation-in-part application of commonly-owned and co-pending PCT application PCT/US00/35529, filed Dec. 28, 2000, which claims the benefit of U.S. provisional application Ser. No. 60/173,920, filed Dec. 30, 1999, now abandoned; each of which related applications is hereby incorporated by reference.

GOVERNMENT LICENSE RIGHTS

The U.S. Government has certain rights in this invention as provided for by the terms of Grant #DAAH 04-95-1-0189, awarded by the Army Research Office, and of Grant No. MSS-9302792, awarded by the National Science Foundation.

FIELD OF THE INVENTION

The invention is related to the field of ice prevention, specifically, to preventing formation of ice on surfaces of solid objects.

BACKGROUND OF THE INVENTION

Statement of the Problem

Ice causes problems on many various kinds of surfaces. For example, ice accumulation on aircraft wings endangers the plane and its passengers. Accumulations of ice formed by the condensation and freezing of water on the outside surfaces of heat exchangers in freezers reduces heat transfer efficiency and often results in physical damage to cooling coils. Problems associated with ice are particularly obvious with respect to land-based transportation systems, including automobiles, trailers, trolleys and railroads. Ice on automobile windshields and windows decreases driver visibility and safety. Removing ice from windshields is a recurring chore that is often unsatisfactorily performed. Ice on roads is frequently a cause of automobile accidents resulting in personal injury and death, as well as material damage. Ice on airport runways causes delays in air traffic. Large amounts of material resources, money and man-hours are spent annually to remove ice and snow from roads, sidewalks and bridges to reduce risks of slipping and skidding on iced surfaces.

Conventional resistive heating systems to remove ice and snow have high, sometimes economically unfeasible, power requirements. Application of chemical agents to remove ice has temporary effects, is limited to relatively small surface areas, and is labor and equipment intensive. Also, once ice has formed on surfaces, it may be difficult to remove. Also, some applications require the prevention of ice in the first place. Growth of even 1 mm of ice at certain locations on airplane wings and helicopter blades seriously decreases their performance. Other examples include ice growth on windshields of airplanes and automobiles and on the outside of freezer coils, which have a low level of tolerance to even thin layers of ice.

SUMMARY OF THE INVENTION

The invention helps to solve some of the problems mentioned above by providing systems and methods for preventing the freezing of a liquid water layer and the formation of ice. In preferred embodiments, AC power is utilized, instead of DC power, thereby avoiding some of the disadvantages associated with DC power and utilizing readily available AC power. Systems and methods in accordance with the invention are applicable to problems associated with ice and surfaces in many diverse fields.

A first basic embodiment in accordance with the invention includes: a first electrode layer disposed on the surface of an object being protected against ice formation; a second electrode layer proximate to the first electrode layer. The first and second electrodes are separated by an interelectrode distance. The first electrode and the second electrode define an interelectrode space between the electrodes. An AC power source is connected to the first electrode and the second electrode. When conductive water fills the interelectrode space between the electrodes, the water completes an electrical circuit including the two electrodes. Preferably, the power source provides an AC voltage having a frequency in a range of from 15 Hz to 1 kHz. The interelectrode distance generally does not exceed 3 mm. Typically, the interelectrode distance does not exceed 500 $\mu$m ("microns", micrometers). Preferably, the interelectrode distance does not exceed 100 $\mu$m, and most preferably, it does not exceed 10 $\mu$m. When the thickness of the interelectrode distance is very small, that is, not greater than 100 $\mu$m, the voltage of the AC power source is generally in a range of from 0.1 to 100 volts, preferably in a range of from 5 to 25 volts. When the interelectrode distance does not exceed 100 $\mu$m, then suitable prevention of ice formation is typically achieved when the current density in a liquid water layer in the interelectrode space is in a range of from 1 to 100 mA/cm$^2$.

Electrodes in accordance with the invention have various shapes. For example, a first electrode or a second electrode may have the shape of, among others, a point or sphere, a line, a strip or a surface-conforming layer.

In one variation of a first basic embodiment, a first electrode layer, a second electrode layer, and a porous insulator layer, between the first and second electrode layers, form a multilayer laminate disposed on the surface of the object being protected against ice. In a second variation of the first basic embodiment, a first electrode layer and a second electrode layer are disposed side-by-side on the surface of the object, separated by the interelectrode space. In this variation, the first electrode layer and the second electrode layer typically are interdigitated, that is, a plurality of "fingers" of the first electrode layer are disposed on the surface alternately with a plurality of "fingers" of the second electrode layer, each of the alternating fingers separated from adjacent fingers by an interelectrode space. In a second basic embodiment of the invention, a DC power source is utilized instead of an AC power source.

BRIEF DESCRIPTION OF THE DRAWINGS

A more complete understanding of the invention may be obtained by reference to the drawings, in which.

DESCRIPTION OF THE INVENTION

The invention is described herein with reference to FIGS. 1–6. It should be understood that the structures and systems depicted in schematic form in FIGS. 1, 2, 4 and 5 serve explanatory purposes and are not precise depictions of actual structures and systems in accordance with the invention. Furthermore, the embodiments described herein are exemplary and are not intended to limit the scope of the invention, which is defined in the claims below.

Figure 1:
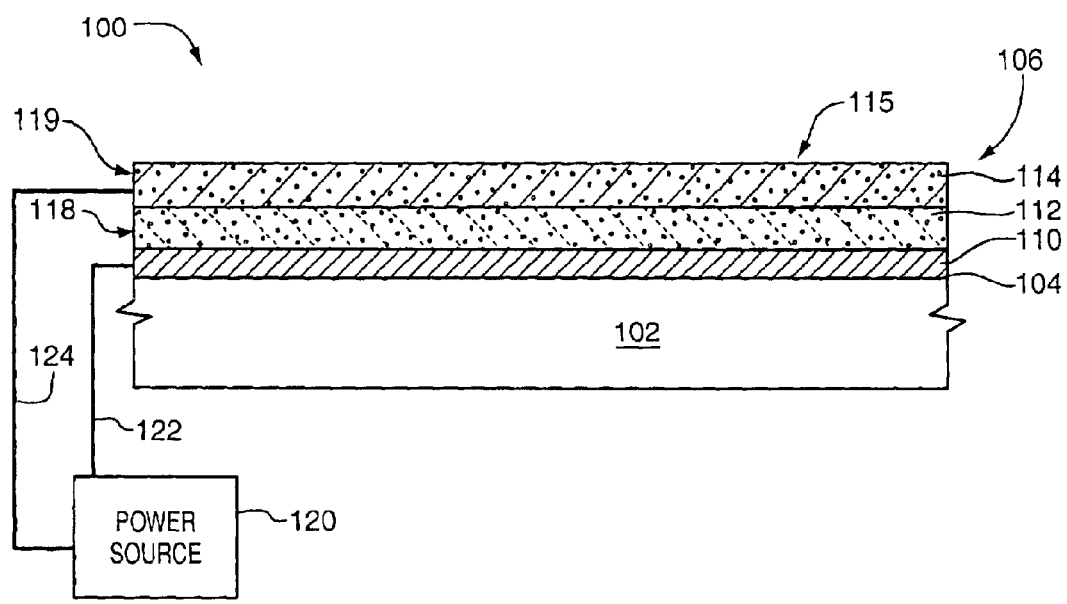
FIG. 1 depicts an embodiment in accordance with the invention suitable for preventing formation of ice on a surface by preventing freezing of a liquid water layer.

The diagram of FIG. 1 depicts a preferred embodiment of a system 100 in accordance with the invention. In system 100, solid object 102 has an exterior surface 104 on which ice formation is prevented by preventing freezing of a liquid water layer. A laminate structure 106 comprising a plurality of layers 110, 112 and 114 is disposed on surface 104. A first electrode layer 110 is located at surface 104. A porous insulator layer 112 is disposed on first electrode layer 110, and a second electrode layer 114 is located on insulator layer 112, covering insulator layer 112, first electrode layer 110 and surface 104. Second electrode layer 114 has an outside surface 115, exposed to water, such as precipitation or condensation water. Continuously porous insulator layer 112 creates an interelectrode space 118 and is porous to water. System 100 further comprises an AC power source 120 electrically connected to first electrode layer 110 and second electrode layer 114 by connector 122 and connector 124, respectively. In system 100, second, top electrode layer 114 and insulator layer 112 are porous to water. As a result, when water deposits on outside surface 115, it fills the pores throughout second electrode layer 114 and the interelectrode space 118 of insulator layer 112, thereby creating a liquid water layer 119 (designated by the solid circles interspersed in interelectrode space 118 and second electrode layer 114 of FIG. 1) that electrically connects first electrode layer 110 and second electrode layer 114.

It is a feature of a system and a method in accordance with the invention that the interelectrode distance between the first electrode and the second electrode is small. Generally, the larger the interelectrode distance, the greater the applied voltage (whether AC or DC) must be to provide sufficient power for preventing freezing of water in the liquid water layer. Based on empirical data contained in the examples described below, one skilled in the art may calculate a voltage corresponding to any thickness of interelectrode distance. Nevertheless, practical considerations generally limit the interelectrode distance to a value less than 3 mm, more typically to a distance not exceeding 500 μm, preferably not exceeding 100 μm, and most preferably not exceeding 10 μm. There is no theoretical lower limit to the size of the interelectrode distance. Generally, the interelectrode distance corresponds to the thickness of the interelectrode space between the first electrode and the second electrode. In FIG. 1, the size of the interelectrode distance is defined by the thickness of porous insulator layer 112, located between first electrode layer 110 and second electrode layer 114. With currently utilized conventional deposition techniques, electrodes and porous insulator layers may be formed routinely to achieve interelectrode distances as small as 5 nm ("nanometer").

As discussed above, the power required in a system in accordance with the invention is highly dependent on the interelectrode distance, with the required voltage decreasing as interelectrode distance decreases. When the interelectrode space does not exceed 100 μm, power source 120 is suitable when it provides a voltage bias in the range of from 1 to 100 volts, preferably in a range of from 5 to 25 volts. In embodiments having an interelectrode space not exceeding 100 μm, a voltage generating a current density in water in the interelectrode space 118 in a range of from 1 to 100 mA/cm², or greater, typically prevents formation of ice down to about −10° C.

In a method in accordance with the invention, when water has deposited on outside surface 115 of laminate 106, it permeates porous second electrode 114 and insulator layer 112, forming a liquid water layer 119. Liquid water layer 119 in interelectrode space 118 electrically connects first electrode layer 110 and second electrode layer 114. When a voltage bias is applied to electrodes 110 and 114, it inhibits ice formation in liquid water layer 119 in the interelectrode space 118, especially near electrodes 110, 114. Presence of even a thin layer of liquid water covering surface 104 of solid object 102 prevents any significant formation of ice on surface 115, even at cold temperatures well below the freezing point of water. Consumption of electrical power to prevent ice formation in a liquid water layer in accordance with the invention is typically in a range of from 0.75 to 10 kW/m². The greater the interelectrode distance is, the greater the applied voltage (whether AC or DC) must be to generate electric power sufficient to prevent ice formation.

A system 100 and a corresponding method are useful in many types of circumstances and for protecting many types of solid objects against ice formation. For example, solid object 102 includes: an airplane wing; a helicopter blade; a heat exchanger coil; roads and sidewalks; windshields and windows; and many others.

A nonexclusive list of materials which may be contained in the first electrode or second electrode layers includes: aluminum, copper, titanium, platinum, nickel, gold, mercury, palladium and mixtures thereof. Other suitable conductive electrode materials include carbon and conductive metal oxides, such as $SnO_2$, $InSnO_2$, $RuO_2$ and $IrO_2$. A specific advantage of embodiments in accordance with the invention in which AC power is applied to the electrodes is that the electrodes may comprise substantially corrosion-resistant titanium. Titanium is virtually useless as electrode material when used with DC voltage. In contrast, titanium functions well as an electrode when the AC voltage has a frequency of 50 Hz or greater.

Figure 2:
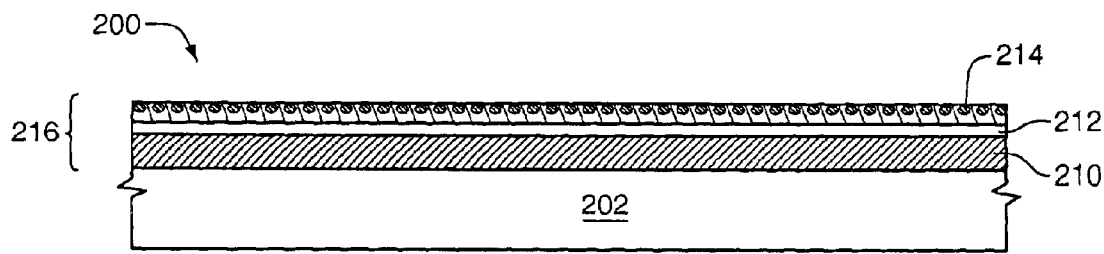
FIG. 2 depicts an exemplary multi-layer laminate in accordance with the invention disposed on an aerofoil.

As depicted in FIG. 2, and described below in Example 1, the second electrode may be a second electrode layer in the form of a mesh having electrically conductive mesh fibers. Typically, mesh fibers comprise a conductive metal. Preferably, the mesh fibers have a thickness in a range of from 1 to 50 μm. Alternatively, the second electrode layer, as well as the first electrode layer, may be formed using standard techniques, such as sputtering, chemical vapor deposition, spraying, painting, photolithography, electroplating and others.

In embodiments in which a porous insulator layer is disposed between the first electrode layer and the second electrode layer, forming the interelectrode space, the porous insulator layer has a total volume and a pore space, and the pore space may occupy between 0 and 100 percent of the total volume. Typically, the pore space occupies about 50 percent or more of the total volume, and preferably about 70 percent. Frequently, the first electrode layer comprises aluminum and the porous insulator layer comprises aluminum oxide. In such embodiments, the porous insulator layer typically comprises anodized aluminum. A first electrode layer comprising aluminum is formed on the surface of the object being protected using any of a variety of standard methods. Then, the upper surface of the first electrode layer is anodized using standard techniques. The anodized aluminum can be made to be porous.

Frequently, the surface of the solid object is conductive or includes the first electrode layer. For example, the conductive outer surface of an airplane wing may function as a first electrode layer in a system in accordance with the invention.

Figure 4:
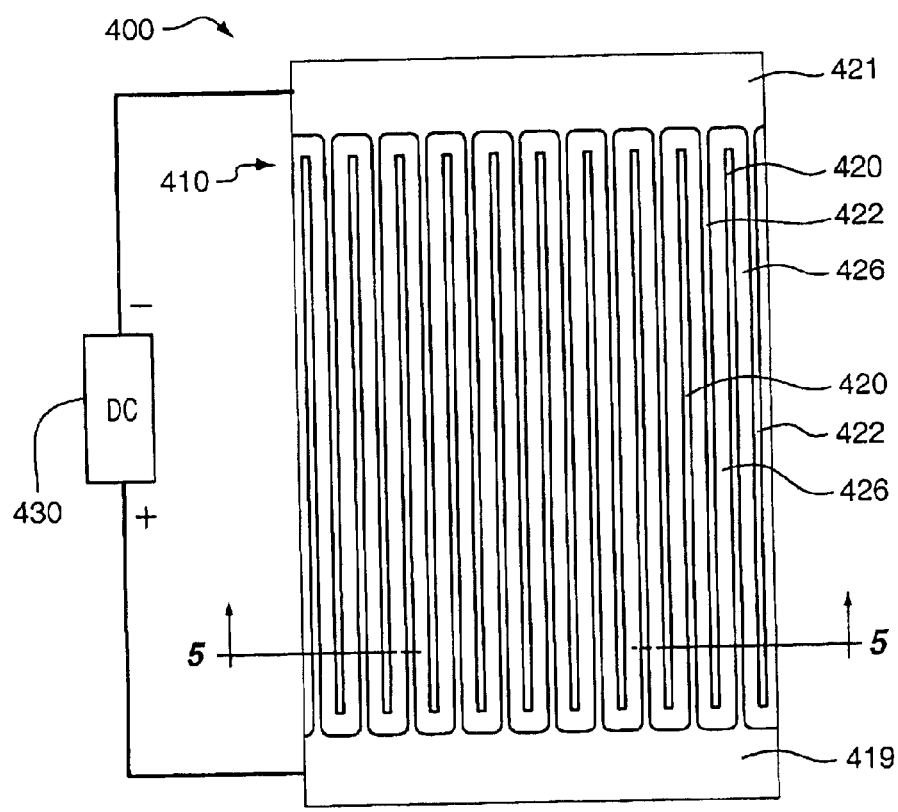
FIG. 4 depicts an exemplary system having interdigitated electrodes.

In some embodiments in accordance with the invention, as depicted in FIG. 4 and described below in Example 2, both the first and the second electrode layers are disposed side-by-side on the surface of the object being protected, separated by an interelectrode distance corresponding to the interelectrode space. In such embodiments, the first and second electrodes are typically interdigitated.

Terms of orientation, such as "top", "bottom", "above" and others, are used with relation to the surface being protected against ice formation. For example, with reference to FIG. 1, bottom electrode layer 110 is closer to surface 104 of object 102 than top electrode layer 114. Therefore, top electrode layer 114 is "above" bottom electrode layer 110. In FIG. 1, surface 104 is substantially horizontal. The term "cover" indicates that a first element that covers a second element is above the second element. For example, in FIG. 1, top, second electrode 114 and covers both bottom, first electrode 110 and surface 104. It is understood that a surface being protected in accordance with the invention may be spatially oriented in many positions different from horizontal.

In a second basic embodiment of systems and methods in accordance with the invention, a DC power supply is used to provide a DC voltage across the first and second electrodes. Otherwise, a DC system and method are virtually the same as described above with reference to FIG. 1, or below with reference to FIGS. 4 and 5. For example, a DC voltage was utilized in Examples 1–4, described below. Although the first, bottom electrode layer 110 of FIG. 1 may serve either as cathode or anode in the DC system, typically, first electrode layer 110 of laminate 106 functions as cathode.

EXAMPLE 1

A system 200 in accordance with the invention is depicted in FIG. 2. An aluminum foil 210 was stretched over a massive cylindrical aluminum aerofoil 202. A porous insulating film 212 of aluminum oxide, $Al_2O_3$, having a thickness of approximately 10 $\mu m$ was formed by anodizing aluminum foil 210. Then, a stainless steel mesh 214 electroplated with nickel and platinum was disposed on the aluminum oxide, forming a three-layer laminate 216. Mesh 214 was a 400-gauge mesh woven of 22.4 $\mu m$ wire. Two thin thermocouples were inserted in the aluminum cylinder at 2 mm and 25 mm from the mesh. Cold air having a temperature of –12° C. and a water content of zero and then 0.25 g/m$^3$ was flowed at a speed of 200 miles/hour across aerofoil 202 covered by laminate 216. A DC power supply having a bias of 50 volts was connected to electrodes 210, 214 during the whole time that measurements were taken. Aluminum foil (first electrode) 210 functioned as the cathode and mesh (second electrode) 214 functioned as the anode.

Figure 3:
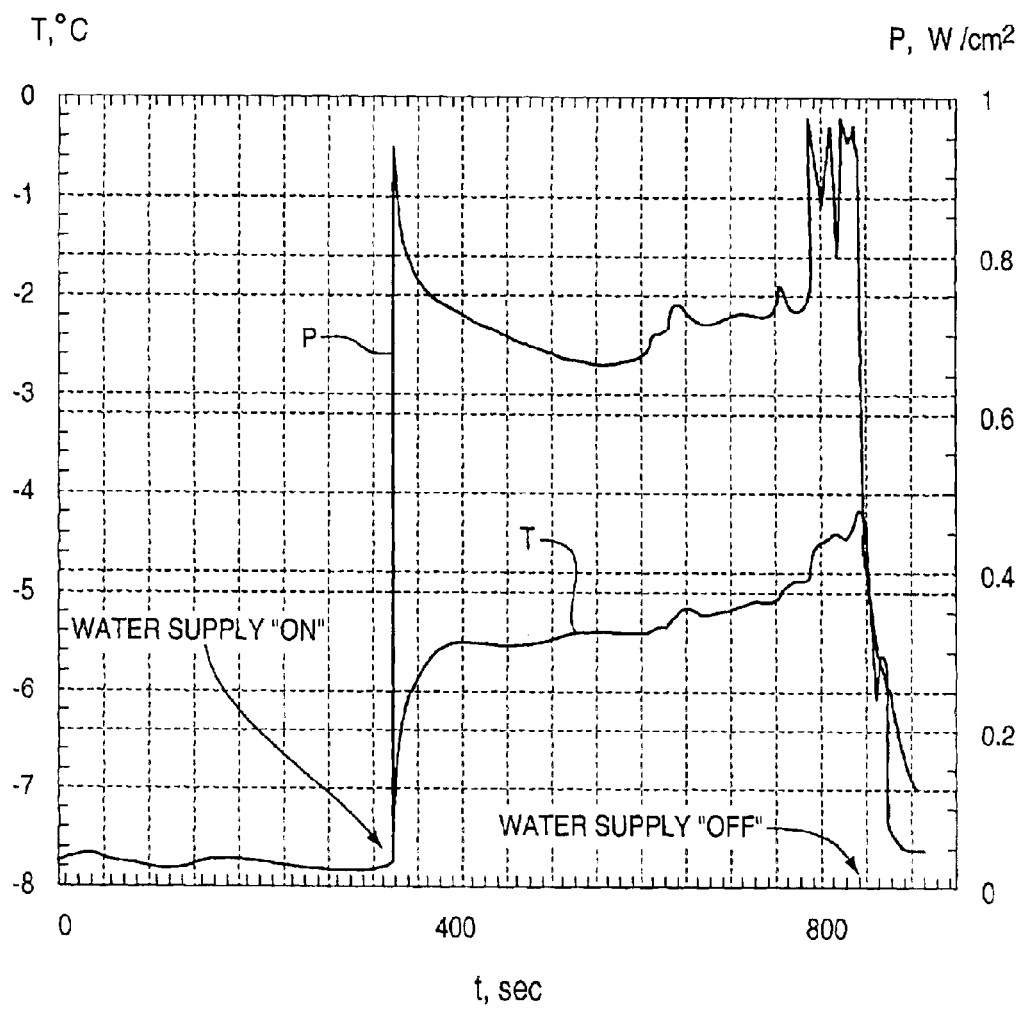
FIG. 3 contains a graph in which leading-edge temperature, T, in ° C., and electric power dissipation, P, in units of W/cm², are plotted as a function of time, t, in seconds, in the exemplary system depicted in FIG. 2.

In the graph of FIG. 3, leading-edge temperature, T, in ° C., and electric power dissipation, P, in the mesh electrodes, in units of W/cm$^2$, are plotted as a function of time, t, in seconds, during which water supply in the cold air was turned "on". The data show that before the water supply was turned on, the temperature measured in the mesh was approximately –8° C., and the power consumption was approximately zero. Even while the power consumption was zero, the mesh temperature exceeded the ambient air temperature due to adiabatic compression of the air at the leading-edge of the aerofoil. At a time of approximately 350 seconds, the water supply through a misting apparatus was turned "on". A stream of micron-size liquid water particles was thereby injected at a rate of 0.25 g/m$^3$ into the cold air stream flowing across the aerofoil. Because the misted water particles were so small, they quickly reached temperature equilibrium of –12° C. with the cold air. On the other hand, the water particles remained liquid at –12° C. because of the large increase in surface energy that would be required to change the particles from the liquid state to a frozen solid state. As the air-borne particles deposited on the surface of the aerofoil, liquid water filled the pores in mesh electrode 214 and the interelectrode space of aluminum oxide layer 212, thereby forming a liquid water layer, which electrically connected aluminum foil electrode 210 and wire mesh electrode 214. As a result, the power consumption suddenly rose to about 0.7–0.9 W/cm$^2$. Also, the measured temperature rose from about –8° C. to about –5° C. The increase in temperature was probably a result of the release of energy as water vapor in the air condensed on the aerofoil. Nevertheless, at no time did liquid water freeze on the surface of the aerofoil even though its measured temperature was –5° C. At a time, t, of approximately 830 seconds, the water supply to the air was turned "off". Thereafter, the water in the mesh and the interelectrode space of the aluminum oxide layer quickly drained off from the leading-edge where the thermocouples were located or evaporated into the dry air. As a result, the electrical connection between the aluminum electrode and the upper mesh electrode was interrupted, causing the power consumption to decrease rapidly from the value of about 1 W/cm$^2$ to almost zero, even though the voltage of the power source was not decreased. Simultaneously, the measured temperature dropped from about –4° C. to about –8° C. The power and temperature curves in FIG. 3 show that while water was supplied to the cold air stream, the liquid water in the liquid water layer on the aerofoil did not freeze and form ice, even though the water was supercooled to a temperature value of at least less than –5° C., during which time power was consumed at a rate of about 0.7–0.8 W/cm$^2$. As explained below in Example 3, the measured electric power consumption would have been insufficient to raise the temperature of the bulk water through resistive heating by even 0.1° C.

Similar prevention of ice formation was observed in exemplary systems in accordance with the invention when the mesh was covered with a thin liquid water layer and the system was cooled by circulating coolant.

EXAMPLE 2

A system as described in Example 1 was assembled, but the porous insulating film of aluminum oxide had a higher pore density, that is, the pore space occupied approximately 70 percent of the total volume of the insulating film. As a result, the water-filled channels of the liquid water layer in the porous insulating film provided higher conductivity (that is, less electrical resistance) between the electrodes, thereby allowing higher current density for a given voltage. Measurements similar to those in Example 1 were made. The same degree of ice prevention as in Example 1 was achieved by using only 20–25 volts, instead of 50 volts. The lower voltage corresponded to an electric power of just 0.3 W/cm$^2$, instead of approximately 0.8 W/cm$^2$ of Example 1.

EXAMPLE 3

Figure 5:
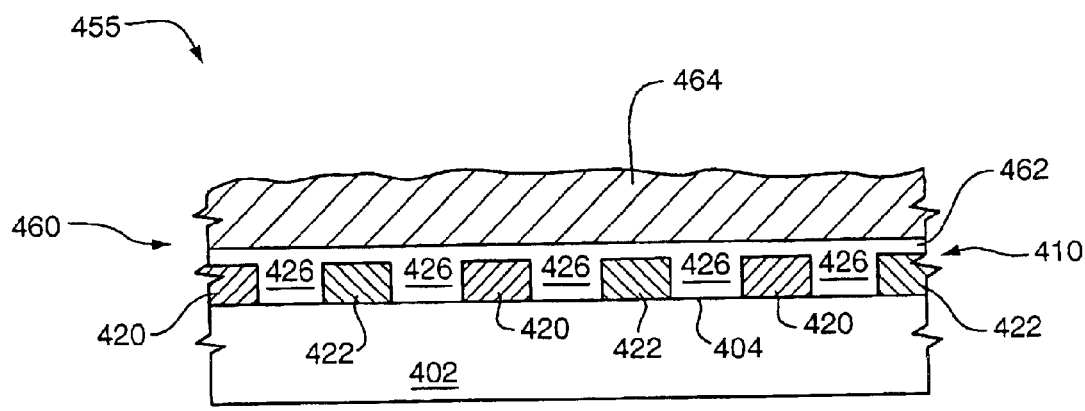
FIG. 5 depicts a schematical cross-sectional view of a portion of a system containing interdigitated electrodes.

Interdigitated copper-grid electrodes were electroplated with gold on the surface of a 125 μm thick kapton film. FIG. 4 shows a top view in schematic form of a system 400 in accordance with the invention having interdigitated electrodes 410. FIG. 5 shows a cross-section section 455 of system 400, indicated by lines 5 in FIG. 4. As depicted in FIGS. 4–5, a first portion of kapton film surface 404 of kapton film 402 was covered with first electrode stem 419 and corresponding first electrodes 420. A second portion of kapton film surface 404 was covered with second electrode stem 421 and corresponding second electrodes 422. A third portion 426 of the electrically nonconductive kapton film surface 404 was not covered with electrode material. Adjacent "fingers" of interdigitated electrodes 410, functioning alternately as anodes 420 and cathodes 422, were separated by interelectrode spaces 426. Interdigitated electrodes 410 each had a width of about 50 μm; a thickness of the metal electrodes was approximately 2 μm. Interelectrode spaces 426 each had a width of about 50 μm. The resulting grid of interdigitated electrodes 410 and interelectrode spaces 426 covered an area on surface 404 of approximately 5 cm×5 cm. A DC power source providing a voltage bias of 5 volts was attached to the anodes and cathodes. Kapton film 402, containing electrodes 410 and interelectrode spaces 426, was covered with about 1 mm of water. As depicted in FIG. 5, water film 460 covered kapton film 402 and interdigitated electrodes 410 and filled interelectrode spaces 426. A voltage of 5 volts was applied, and then the system was cooled to −10° C. A current density of about 1 mA/cm$^2$ was measured in the water between selected anodes and cathodes. As long as the voltage was continuously applied, a liquid water layer 462 directly adjacent to the electrodes 410 did not freeze, while an upper ice layer 464 of water film 460 formed as a result of the freezing temperature. The unfrozen liquid water layer 462 had a thickness estimated optically as 5 to 25 μm. The temperature of the substrate film 402 and the ice 464 above the electrodes 410, as measured with the thin thermocouples, was maintained at −10° C. A simple calculation showed that the low electric power density of ≦0.5 mW/cm$^2$ could have warmed the liquid bulk of liquid water layer 462 by only about 0.05° C. above ambient temperature by resistive heating. Power was turned "off", resulting in complete freezing of liquid water layer 462. After freezing occurred, a voltage bias was applied to the electrodes again, but at a higher voltage in order to provide the same electric power as before freezing (the electrical conductivity of the ice is less than liquid water, so a higher voltage is required in the ice to provide the same power as in water). The application of the same electric power to the ice that had prevented freezing of water in liquid water layer 462, however, did not cause melting of the layer of ice. This indicates that the voltage applied to the electrodes in the liquid water system prevented ice formation in accordance with the invention, but the same electric power was unable to melt ice through heating after the ice had formed. It should be noted that the thickness of 2 μm of the metal electrodes in Example 3 was larger than necessary to provide sufficient electric current through the liquid water layer.

Physical Mechanisms

It is believed that one or both of two different physical mechanisms explain the results of Examples 1–3, specifically, and the function of embodiments in accordance with the invention, generally.

According to the first prospective physical mechanism, an embodiment in accordance with the invention prevents formation of ice through localized resistive heating and melting of ice crystals during initial ice nucleation in supercooled water. Accordingly, in supercooled water between electrodes, a very thin layer of ice starts to grow in the bulk water of liquid water layer between electrodes, or as is more common, at the electrode, where water has a greater tendency to nucleate into ice crystals at the solid surface of the electrode. A current passing through the liquid water layer between electrodes also passes through the ice layer. Ice has an electrical resistivity that is from 2 to 4 orders of magnitude greater than the resistivity of water. See *Physics of Ice*, V. Petrenko and are R. Whitworth, Oxford University Press (1999). As a result, when even a thin layer of ice appears, most of the electrical power dissipates in the ice, rather than in the liquid water. When a layer of ice appears, the heat produced by electric current passing through the highly resistive ice melts the ice in its nucleation stage, even in a supercooled liquid water. Thus, electric current actually prevents ice nucleation. Calculations show, for example, that if liquid water is supercooled to −10° C., and if a layer of ice having a thickness of 10 μm forms, then a current having a current density of approximately 13 mA/cm$^2$ melts the ice. This is similar to the current density that prevented freezing and ice formation in Example 1. This mechanism succeeds in maintaining the liquid state of even supercooled water because it prevents development of ice seeds during nucleation. Ice cannot form without ice seeds. On the other hand, once ice has formed beyond the nucleation stage, it is not possible to melt the ice using the same level of power described here to prevent the ice. Also, to keep the water above its melting temperature by heating it requires much more power, that is, from 10 to 100 times more power than it does to prevent formation of ice by melting ice seeds in their nucleation stage.

Therefore, the term "prevention of ice" and similar related terms when used in this specification have a qualified meaning. In view of the foregoing discussion concerning heating and melting of ice seeds during ice nucleation, it is clear that relatively small amounts of ice crystals may form in a system and a method in accordance with the invention, before being heated and melting. Thus, the term "prevention of ice" means that the bulk of the liquid water in a liquid water layer in and around the interelectrode space does not freeze, and that a thin liquid water layer in the interelectrode space and in the regions immediately adjacent to the electrodes remains liquid. The term "prevention of ice" and related terms also include a broader meaning. They also refer to inhibiting the formation of significant ice deposits on a liquid water layer. Because it is very difficult for ice to collect and remain on a liquid water surface, a liquid water layer in accordance with the invention disposed on a solid surface, such as an airplane wing or a windshield, effectively prevents the growing and adhesion of solid ice on the surface. Similarly, the term "prevent freezing of liquid water" and related terms means that the liquid water layer remains substantially unfrozen, although minute volumes of water may freeze during initial nucleation before melting in accordance with the invention. In a system and method in accordance with the invention, ice may form in regions not included in the liquid water layer in and around the interelectrode space. For example, ice may form or be deposited on upper surface 115 of second electrode 114 of FIG. 1.

Development of significant deposits of ice contiguous with the liquid water layer does not occur, however, because of insufficient adhesion strength between ice and the liquid water layer. The term "supercooled water" has its usual technical meaning of liquid water having a temperature lower than its freezing temperature. The term "liquid water layer" is used in a broad sense in this specification. Its meaning includes a continuous volume of liquid water capable of electrically connecting two electrodes, in electrical contact with the electrode, and capable of carrying an electrical current. A "liquid water layer" may be any uninterrupted volume of water, that is, uninterrupted by non-water materials. Or, for example, a "liquid water layer" may comprise a plurality of water channels interspersed in a non-water material, for example, in a porous insulator layer, as described above. The liquid water layer is not necessarily confined to the boundaries of an interelectrode space. For example, in FIG. 1 a liquid water layer occupies the pore space of porous insulator 112 and the pore space of porous second electrode 114. In system 400 depicted in FIG. 4, a liquid water layer covered the whole surface area containing interdigitated electrodes 410 and interelectrode space 426. The term "interelectrode distance" refers to the shortest distance between the first electrode and the second electrode of a system in accordance with the invention. Embodiments in accordance with the invention are described herein with reference mainly to electrode layers. In other embodiments in accordance with the invention, however, functional electrodes have non-layer shapes, such as, sphere-shaped or wire electrodes. Thus, the term "interelectrode space" refers generally to a region located between the first and second electrodes. For example, interelectrode space 118 shown in the cross-sectional view of system 100 in FIG. 1 is a layer-like region between electrode layers 110 and 114.

In a given system under given conditions, the extent of the liquid water layer, that is, the region of liquid water that is prevented from forming ice, is dependent on the amount of electric power applied. By increasing electric power, the volume of liquid water that does not freeze increases. In the first proposed mechanism, the flow of electrical current through the liquid water layer results in heating and melting of ice seeds in their nucleation phase before they grow appreciably. Operation according to this mechanism occurs when the current density reaches or exceeds a minimum level, as discussed above. Theoretically, the current may be generated from any source. For example, a capacitive AC current generated in a high-frequency alternating electromagnetic field can provide sufficient current to prevent ice formation in accordance with the invention. Practically, however, in preferred embodiments, as described in detail in this specification, a liquid water layer provides electrical connection between two electrodes, and the electrical power source provides a voltage across the electrodes, which generates the electrical current. Either AC or DC current melts ice seeds in their nucleation stage in accordance with the invention. AC current having a frequency greater than about 10–15 Hz is usually preferred in order to avoid electrolytic corrosion of electrodes.

According to the second prospective mechanism, applying a voltage to an electrode in the liquid water layer generates intrinsic water ions that depress the freezing point of water, thereby preventing ice formation.

When a low-frequency ("LF") AC voltage or a DC voltage is applied across two electrodes immersed in water, an increase in electrical conductivity of the water occurs and supercooled water remains liquid. These phenomena are fully reversible, and water regains its physical properties within about ten seconds after the voltage bias is shut "off". The maximum effects occur very close to the electrodes. It is believed that these phenomena are the result of the generation of intrinsic water ions in the bulk water resulting from migration of chemical reaction products formed at the electrode surfaces.

The generation of $H^+$ and $OH^-$ ions at the electrode interfaces may be represented according to the following reaction equations:

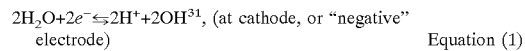

$2H_2O+2e^- \leftrightharpoons 2H^+ + 2OH^{31}$, (at cathode, or "negative" electrode)　　　　Equation (1)

and

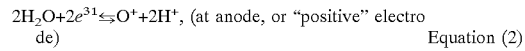

$2H_2O+2e^{31} \leftrightharpoons O^+ + 2H^+$, (at anode, or "positive" electrode)　　　　Equation (2)

where $O^+$ and $H^+$ are atomic oxygen and hydrogen radicals. These reactions occurring at the electrodes are typical water electrolysis reactions. During electrolysis, atomic hydrogen atoms recombine at the cathode, forming bubbles of molecular $H_2$ gas. Similarly, atomic oxygen atoms recombine at the anode, forming bubbles of molecular $O_2$ gas during electrolysis. Another phenomenon occurs, however, which was not previously recognized in the art. Atomic oxygen and hydrogen radicals, $O^+$ and $H^+$, migrate naturally from regions of high concentration at the electrodes into the bulk of the water between electrodes. There, in the bulk water between electrodes, those atoms similarly recombine into molecules of oxygen and hydrogen. Each recombination event releases about five electron volts of energy, and that energy is sufficient to break several neighboring water molecules into $H^+$ and $OH^-$ ions. It is estimated that as many as 10 percent of the water molecules near the electrodes may dissociate into ions; this is equivalent to an $H^+$ or a $OH^-$ concentration of 3.08 moles per liter. When the electrodes are relatively far apart, as in typical electrolysis systems, the concentration of intrinsic water ions, $H^+$ and $OH^-$, remains insignificant. When the electrodes are close together, however, in accordance with the present invention, it is believed that the intrinsic water ion concentration is sufficient to depress the freezing point of the bulk water in a liquid water layer in the interelectrode space between electrodes.

A thermodynamic reason for the freezing point depression is that dissolution of the ions in such a highly polar liquid as water lowers the free energy of the water. These ions affect the free energy of ice to a much less degree, due to the fact that the microscopic dielectric constant of ice is just 3.2, while in water it equals about 87 (at 0° C.). Also, impurity ions are much less soluble in ice than in water. Thus, ions decrease the free energy of water, but leave that of ice almost unchanged. Because of this, the free energy of water remains less than that of ice down to lower temperatures, thus delaying the phase transition. It is believed that systems and methods in accordance with the invention could achieve freezing point depressions in water in a range of from 1° C. to a theoretical upper limit of 80° C. The extent of the freezing point depression is dependent on numerous factors, including among others: the initial, pre-voltage ion-content and conductivity of the water; the interelectrode distance; the magnitude of the applied voltage; the frequency of the applied voltage; and the composition of the electrodes. The term "electrode" is used in a broad sense in this specification. The term "electrode" refers to an electrical conductor at the surface of which a change occurs from conduction by electrons to conduction by ions or colloidal ions. The term "voltage" is used in a broad sense. The term voltage may refer to the voltage of a circuit not effectively grounded, so that it means the highest nominal voltage available between any two conductors of an electrical circuit. It may also refer to the voltage of a constant current circuit, for which it means the highest normal full-load voltage of the current. It may refer to the voltage of an effectively grounded circuit, that is, the highest nominal voltage available between any conductor of the circuit and ground, unless otherwise indicated. The term "voltage" may also mean the effective (rms) potential difference between any two conductors or between a conductor and ground.

EXAMPLE 4

Figure 6:
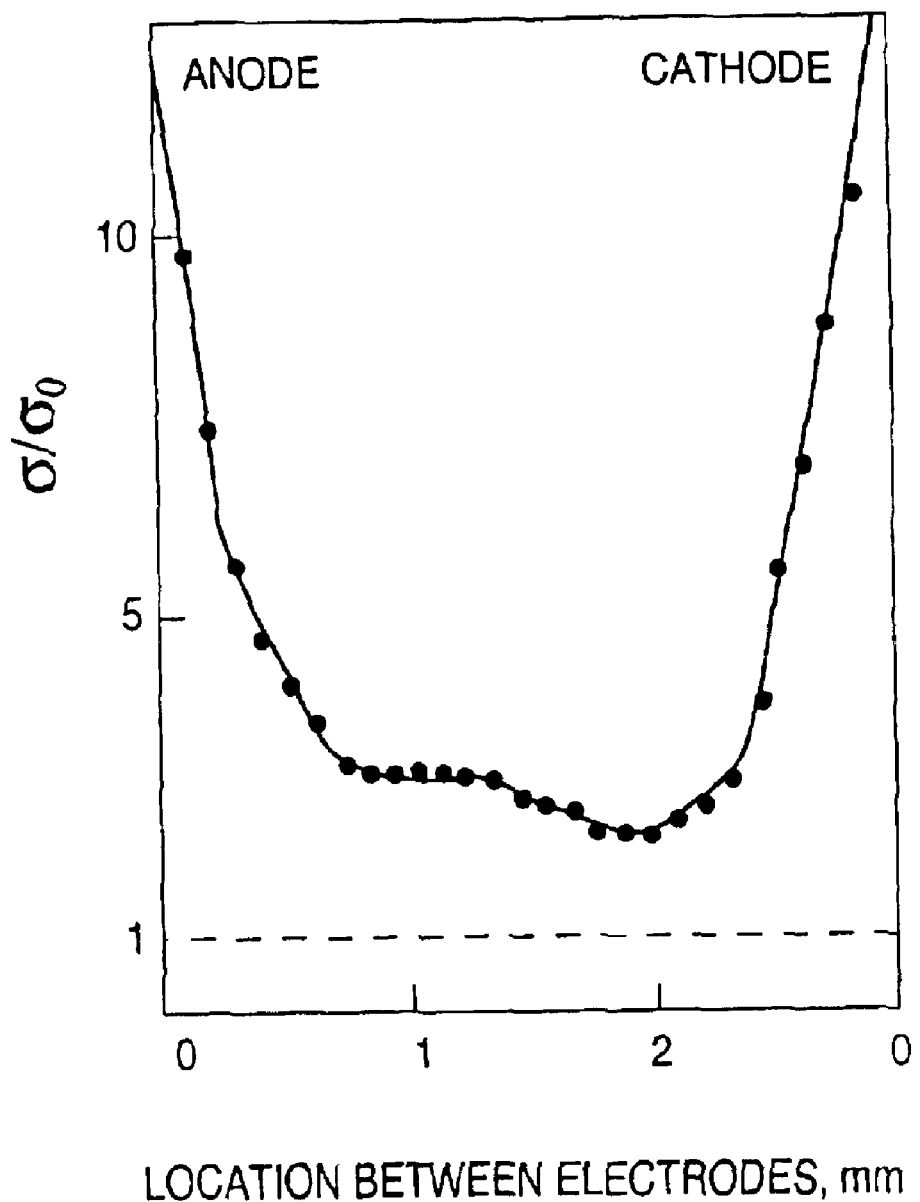
FIG. 6 is a graph in which relative electrical conductivity is plotted as a function of location between electrodes, spaced approximately 3 mm apart.

The relative conductivity was measured in distilled water disposed between two platinum electrodes. A DC bias of 5V was applied across the electrodes. The temperature of the system was 20° C. AC conductivity, $\sigma$, of the water between the electrodes was measured at a frequency of 1 kHz. The initial conductivity of the distilled water before application of the DC bias was $\sigma_0 = 10^{-3}$ S/m. In the graph of FIG. 6, relative conductivity, $\sigma/\sigma_0$, is plotted as a function of location between the electrodes, which were spaced approximately 3 mm apart. The data points plotted in FIG. 6 show that at a distance of about 400 $\mu$m from either the cathode or the anode, the relative conductivity had a value of about 5. At a distance of about 100 $\mu$m from either the anode or cathode, the relative conductivity was about 10. This increase in conductivity is a result of the increase in intrinsic ion concentration of $H^+$ and $OH^-$ ions generated in the interelectrode space between the electrodes.

Theoretically, even a single electrode having a voltage and being in contact with a liquid water layer can generate either atomic oxygen or hydrogen radicals, which can recombine in the bulk water to form intrinsic water ions. Practically, however, in preferred embodiments in accordance with the invention, a liquid water layer provides electrical connection between two electrodes, and an electrical power source provides a voltage across the electrodes, so that atomic radicals are generated at both electrodes. Furthermore, the voltage across the electrodes generates an electric current that passes through the liquid water layer, preventing ice formation according to the first proposed mechanism. Therefore, the terms "voltage" and "current" are used somewhat interchangeably in this specification. An advantage of systems and methods in accordance with the invention is the ability to use relatively low amounts of electric power to prevent freezing in a liquid water layer and thereby prevent ice formation. Another advantage is the ability to use AC voltage. In contrast, electrolysis only works with DC voltage or AC voltage having a very low frequency not exceeding 10–15 Hz to produce hydrogen and oxygen gas bubbles that decrease ice adhesion. In systems utilizing electrolysis to form gas bubbles, DC voltage or very low frequency AC voltage is utilized to provide a high concentration of hydrogen radicals, at the cathode, and oxygen radicals, at the anode, that recombine to form bubbles of molecular gas. At frequencies greater than 10–15 Hz, there may be insufficient accumulation of molecular hydrogen and molecular oxygen at the electrodes to initiate nucleation of gas bubbles on the electrodes. In systems and methods in accordance with the invention, the polarity of each of the two electrodes alternates between plus and minus with the frequency of the AC power source. At frequencies in excess of 10–15 Hz, the continuous switching between production of atomic hydrogen radicals and atomic oxygen radicals, therefore, may not allow accumulation of either hydrogen or oxygen sufficient for nucleation of gaseous $H_2$ or $O_2$ bubbles. The atomic oxygen and hydrogen radicals, $O^+$ and $H^+$, that are produced alternately at the electrodes do, however, migrate from the electrodes into the bulk water, where they recombine, releasing energy and thereby produce additional $H^+$ and $OH^-$ ions. When the electrodes are relatively close together, it is believed that the resulting concentration of $H^+$ and $OH^-$ ions produced at the electrodes and by the recombination events in the bulk water depresses the freezing point of the water.

The first electrode and second electrode layers may comprise any conductive metal at which the reactions represented by Equations (1) and (2) occur. In platinum-plated electrodes, platinum functions as a catalyst for the reactions represented by Equations (1) and (2).

In preferred embodiments in accordance with the invention, an AC power source is utilized. The frequency of the AC power source may be selected from range of from 0 through the MHz range, with practically no upper limit. In other words, in the lower end of the range, virtually DC voltage may be applied across the electrodes. An advantage of using AC voltage is that it is often more readily available and it inhibits corrosion, as mentioned above. Preferably, an AC power source generates an AC current having a frequency in a range of from 15 Hz to 1 kHz. The preferred lower limit of 15 Hz is the frequency at which the amounts of electrolysis gases collecting at the electrodes become insignificant. As a result, the tendency of electrodes to corrode decreases significantly above 15 Hz. The preferred upper limit of approximately 1 kHz is determined by the time period required for so-called Helmholtz double-layers to form on each electrode and in the corresponding adjacent layer of water surrounding an electrode. A Helmholtz double layer is essentially a surface charge at each surface of the electrode-water interface necessary for the reactions of Equation (1) and Equation (2) to occur at the negative and positive electrodes, respectively. As frequency exceeds 1 kHz, there is essentially not enough time for Helmholtz layers to form, and the reactions of Equations (1) and (2) do not occur sufficiently to achieve substantial increases in intrinsic water ion concentration to effect freezing point depression.

Systems and methods in accordance with the invention are useful in a wide variety of circumstances and applications to prevent freezing of a liquid water layer and thereby prevent ice formation on the solid surface. Examples of surfaces that may be protected in accordance with the invention include, nonexclusively: airplane wings and helicopter blades; windshields and windows of planes, automobiles, and trains; and heat exchanger coils. It is evident that those skilled in the art may now make numerous uses and modifications of the specific embodiments described, without departing from the inventive concepts. It is also evident that the steps recited may, in some instances, be performed in a different order; or equivalent structures and processes may be substituted for the structures and processes described. Since certain changes may be made in the above systems and methods without departing from the scope of the invention, it is intended that all subject matter contained in the above description or shown in the accompanying drawing be interpreted as illustrative and not in a limiting sense. Consequently, the invention is to be construed as embracing each and every novel feature and novel combination of features present in or inherently possessed by the systems, methods and compositions described in the claims below and by their equivalents.

I claim:

1. A system for preventing ice formation on a surface of a solid object, comprising:

a first electrode disposed on the surface;

a second electrode proximate to the first electrode;

an interelectrode space separating the first and second electrodes, wherein the interelectrode space has a thickness not exceeding 3 mm; and an AC power source connected to the first and second electrodes, the power source capable of providing an AC voltage with sufficient power to prevent freezing of a liquid water layer in the interelectrode space.

2. A system as in claim 1, wherein the interelectrode space has a thickness not exceeding 500 $\mu$m.

3. A system as in claim 1, wherein the interelectrode space has a thickness in a range of from 5 nm to 100 $\mu$m.

4. A system for preventing ice formation on a surface of a solid object, comprising:

a first electrode disposed on the surface;

a second electrode covering the first electrode, the second electrode being exposed to water and being porous to water;

an interelectrode space separating the first and second electrodes; and an AC power source connected to the first and second electrodes, the power source capable of providing an AC voltage with sufficient power to prevent freezing of a liquid water layer in the interelectrode space.

5. A system as in claim 4, wherein the second electrode is a mesh comprising metal mesh fibers.

6. A system as in claim 5 wherein the metal mesh fibers have a thickness in a range of from 1 to 100 $\mu$m.

7. A system as in claim 4, further comprising a porous insulator layer disposed between the first electrode and the second electrode, the porous insulator layer forming the interelectrode space and being porous to water.

8. A system as in claim 7, wherein the porous insulator layer has a total volume and a pore space, and the pore space occupies between 0 and 100 percent of the total volume.

9. A system as in claim 8, wherein the pore space occupies in a range of from 50 to 70 percent of the total volume.

10. A system as in claim 7, wherein the first electrode comprises aluminum and the porous insulator layer comprises aluminum oxide.

11. A system as in claim 10, wherein the porous insulator layer comprises anodized aluminum.

* * * * *

UNITED STATES PATENT AND TRADEMARK OFFICE
CERTIFICATE OF CORRECTION

PATENT NO. : 6,847,024 B2
DATED : January 25, 2005
INVENTOR(S) : Victor F. Petrenko It is certified that error appears in the above-identified patent and that said Letters Patent is hereby corrected as shown below:

<u>Column 10,</u>
Line 10, "$2H_2O+2e^- \Leftrightarrow 2H^+ + 2OH^{31}$" should read
-- $2H_2O+2e^- \Leftrightarrow 2H^{\bullet} + 2OH^-$ --.
Line 14, "$2H_2O+2e^{31} \Leftrightarrow O^+ + 2H^+$" should read -- $2H_2O-2e^- \Leftrightarrow O^{\bullet} + 2H^+$ --.

Signed and Sealed this

Second Day of May, 2006

JON W. DUDAS
*Director of the United States Patent and Trademark Office*